April 26, 1932.  L. S. PFOUTS  1,855,770
FREEZING APPARATUS
Original Filed Jan. 21, 1928  2 Sheets-Sheet 1
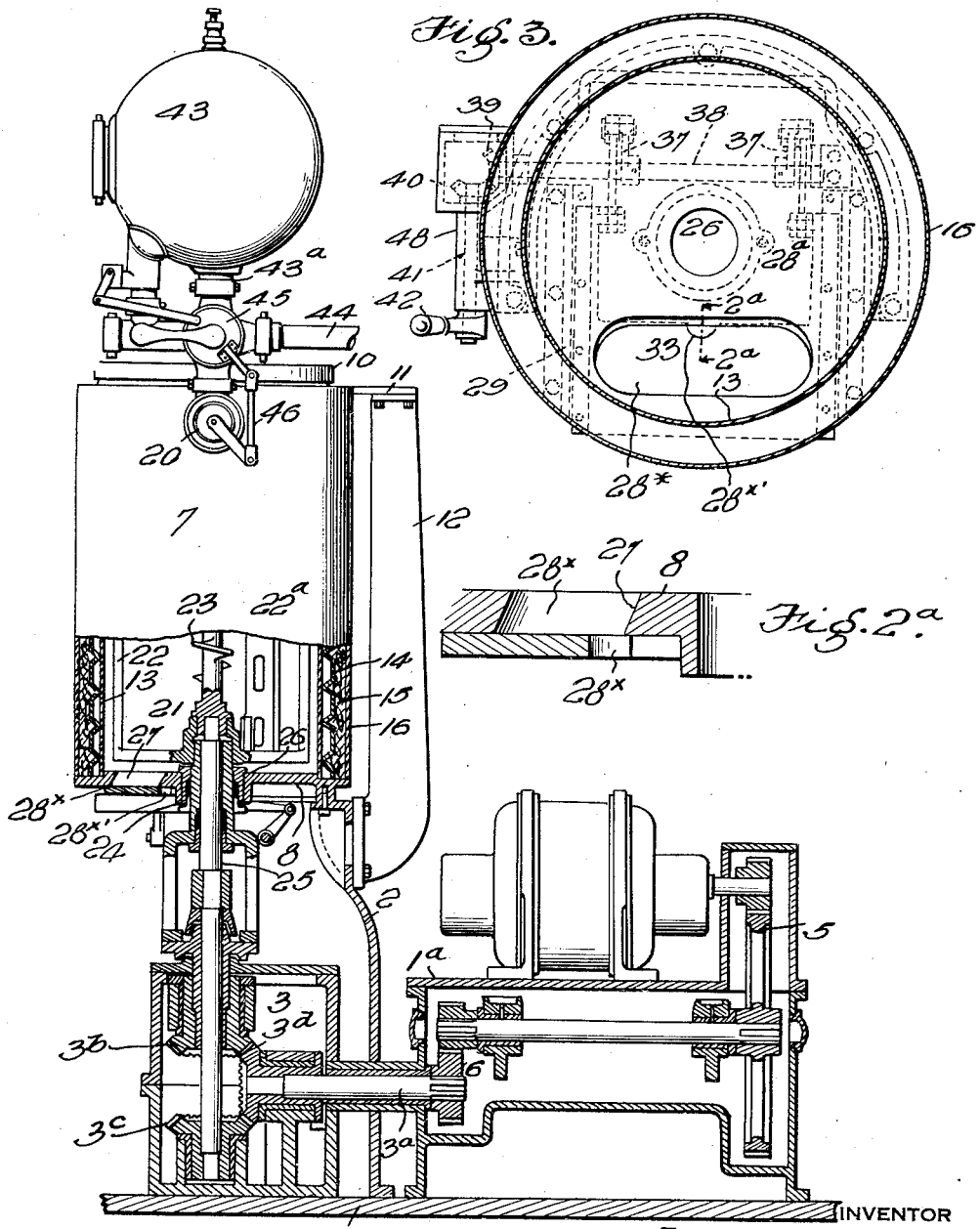
INVENTOR
Leroy S. Pfouts, Dec'd.
by Joan S. Pfouts, administratrix
By Geo. B. Pitts
ATTORNEY April 26, 1932. L. S. PFOUTS 1,855,770
FREEZING APPARATUS
Original Filed Jan. 21, 1928  2 Sheets-Sheet 2
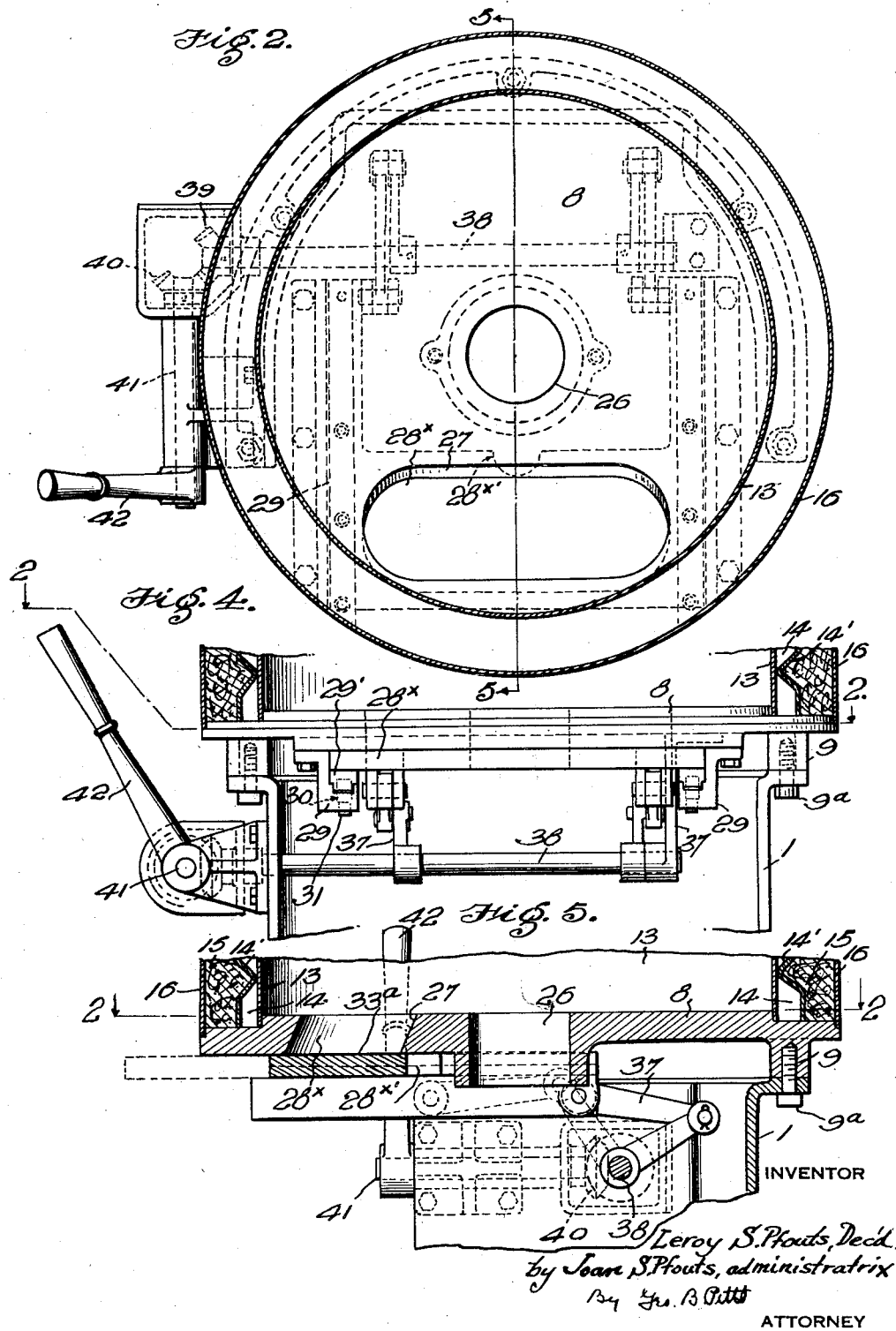

Patented Apr. 26, 1932

1,855,770

UNITED STATES PATENT OFFICE

LEROY S. PFOUTS, DECEASED, LATE OF CANTON, OHIO, BY JOAN S. PFOUTS, ADMINISTRATRIX, OF CANTON, OHIO, ASSIGNOR TO THE H. H. MILLER INDUSTRIES COMPANY, OF CANTON, OHIO, A CORPORATION OF OHIO

FREEZING APPARATUS

Original application filed January 21, 1928, Serial No. 248,543. Divided and this application filed August 10, 1928. Serial No. 298,821.

This invention relates to an apparatus for freezing materials, such as ice cream, ices, and the like.

This application is a division of an application filed January 21, 1928, Ser. No. 248,543.

In the freezing of materials particularly cream and other milk products, it is desirable to beat and agitate the batch in a manner and under conditions which will uniformly and rapidly effect freezing thereof to the desired temperature and yield and to then relatively quickly and without delay in emptying or undue exposure store the frozen batch in ice and salt or in a refrigerated storing room for hardening.

In order that the operator may determine when the material is in condition for discharge, it is desirable to remove a small portion of the material and subject it to a suitable test. According to the usual custom the discharge valve is opened to discharge a small quantity of the material, but this operation has been found to be disadvantageous due to waste and resultant insanitary conditions.

One object of the invention is to provide an improved freezer construction in which these conditions are entirely eliminated.

Another object of the invention is to provide an improved freezing apparatus having a valve mechanism capable of permitting a relatively small discharge or a relatively large discharge of the material being treated.

Another object of the invention is to construct a freezer having an improved valve means for permitting in a ready manner and without waste testing of the material during the freezing operation.

Other objects of the invention will be apparent to those skilled in the art to which the invention relates from the following description taken in connection with the accompanying drawings, wherein Fig. 1 is a front elevation of an apparatus for freezing materials embodying the invention.

Fig. 2 is a section on the line 2—2 of Figs. 4 and 5.

Fig. 2a is a section on the line 2a—2a of Fig. 3.

Fig. 3 is a view similar to Fig. 2, but showing the testing valve in open position.

Fig. 4 is a fragmentary front view, partly in section.

Fig. 5 is a section on the line 5—5 of Fig. 2.

In the drawings, 1 indicates a base on which is mounted a support 2 preferably of substantially semi-cylindrical shape to partially enclose a suitable driving mechanism, indicated as an entirety at 3. 4 indicates a motor mounted on a separate support 1a and operating through suitable gear reductions 5, 6, to drive a main shaft 3a of the driving mechanism 3.

7 indicates as an entirety the freezing member disposed in vertical position and having a bottom wall or head 8. The bottom or head 8 is provided with a flange 9 secured for example by cap screws 9a to the upper portion of the support 2. The upper end of the freezer member 7 is provided with a ring, forming an opening which is closed by a removable head 10; the ring being provided with a bracket 11 which is secured to the upper end of a column or standard 12. The column 12 being rigidly secured to the support 2, serves to brace the freezing member 7 thereon. The freezing member 7 comprises an inner cylinder 13 and means for supplying a heat transfer medium in contact with its outer wall, such means in the present illustrated embodiment comprising a circuitous passage 14 for brine formed by a corrugated sheet metal jacket 14'. The jacket 14' may be insulated by suitable material 15 and the latter enclosed in a cylinder 16. The wall 13 and jacket 14' are connected at their ends to the head 8 and ring in a suitable manner to insure liquid-tight joints and the engaging surfaces between the ring and head 10 are ground to insure a liquid-tight fit. The brine is supplied to and conducted away from the passages 14 by valve controlled pipes 17 (not shown). The material to be frozen may be introduced into the cylinder 13 in any desired manner, but preferably by a pipe leading through the side wall of the freezer member 7 at any desired point between the head 8 and ring, a valve 20 being provided for controlling such material supply and devices for maintaining the opening through the pipe clear may be provided in the pipe; the construction and arrangement of the inlet pipe and the valve 20 and devices connected thereto being preferably similar to like parts shown in Letters Patent No. 1,191,222, dated July 18, 1916.

21 indicates as an entirety the combined agitating, beating and scraping mechanism within the cylinder 13, which may comprise one or more rotatable members depending upon the nature or character of the material being frozen. In the illustrated form of construction two members are provided, an outer member 22, which preferably includes one or more scrapers 22a, and an inner member 23, said members being connected (preferably removably) with shafts 24, 25, respectively extending through an opening 26 formed axially in the head 8. As shown, the shafts 24, 25, are connected to the gears 3b, 3c, of the driving mechanism 3, by means that operate to prevent leakage of liquid into the driving mechanism 3 or the casing therefor, such means forming the subject-matter of a copending application Ser. No. 212,977, for which reason no claim is made herein to such subject-matter. The gears 3b, 3c, mesh with and are driven in opposite directions by a main gear 3d secured to the shaft 3a.

27 indicates a relatively large opening formed in the head 8 and serving as the discharge opening for the batch of frozen material. The opening is controlled by a valve 28, movably mounted with respect to the head 8. The opening 27 is of a size to permit the entire batch (excepting portions that may adhere to the walls and parts) to freely flow through it in a short period of time upon the operation of the valve 28 to its open position, the result being that the continued operation of the mechanism 21 during the discharge of the material (as is the customary practice) and the low temperature within the cylinder 13 and effect of the refrigerant around it, will not, to any considerable degree, change or affect the condition or temperature of the last portion of the batch to flow through opening with respect to the first portion flowing therethrough when emptying or discharge takes place. It will therefore be seen that the entire frozen mass or batch will have a substantially uniform temperature and swell. The discharged batch may flow into a storing can or into a trough, as shown in the aforesaid copending application. To form the opening 27, the major portion of the metal of the head 8, forward of a diametrical line extending from side to side of the head, is cut away.

The valve 28 preferably comprises a plate 28x movably supported on the lower face of the head 8, for which purpose the latter is provided with guides 29 arranged to permit the valve 28x to slide forward to the position shown in dotted lines in Fig. 5.

The valve plate or element 28x may be yieldingly pressed against the head 8 to insure liquid tightness by shoes 29' normally biased toward the valve 28 by a plurality of springs 30 supported on the heads of adjustable plugs 31 threaded in openings formed in the guides 29.

The valve 28x may be operated by one or more toggles 37 connected to a rock shaft 38 suitably mounted below the head 8. The shaft 38 carries a gear 39 in mesh with a gear 40. The gear 40 is fixed to a shaft 41 which carries a lever or handle 42.

33 indicates a valve for permitting the discharge of a relatively small quantity of material, for example, into a small container. The valve 33 may be operated during the freezing operation, whereby the operative can, at will, permit the discharge of a small quantity into a testing cap to determine the condition of the batch and its swell, so that the discharge of the entire batch of material may be effected at the proper time. To provide the valve 33, the valve plate 28x is shaped to co-operate with a portion of the side wall forming the opening 27, so that when the valve plate is moved to a predetermined position a relatively small amount of material may be discharged, for example, for testing purposes, as already set forth, without opening the valve opening 27. In this embodiment of my invention, the inner edge of the valve plate 28x is cut away, as shown at 28x', preferably midway between its ends, so that when the plate is moved outwardly, to the position shown in Fig. 3, the cutaway co-operates with the adjacent wall of the opening 27 to form a discharge port for the purposes already set forth. When the valve 28x is moved inwardly, the opening 27 is completely closed as shown in Fig. 2; when moved outwardly to full open position, the opening 27 is completely uncovered to permit emptying of the entire frozen mass as already set forth.

The position of the valve element 28x to permit discharge through the valve 33 may be indicated for the guidance of the operative to facilitate the operation of the valve plate 28x, by graduations or other suitable markings on the bearing sleeve 48 for the shaft 41, whereby the movement of the handle 42 to positions relative to such marks will indicate either or both positions of the valve plate 28x. This construction and arrangement avoids the necessity of providing a valved testing outlet in and through the side walls of the cylinders forming the freezing member; on the other hand by provision of the valve 33, as shown, the cost of construction is reduced and the arrangement is relatively simple and both valve openings are readily controlled.

43 indicates a suitable measuring receptacle having a discharge pipe 43a leading to the casing of the valve 20. 44 indicates a supply pipe leading to the receptacle 43.

The pipes 43a, 44, are connected to each other so that a single valve 45 may control the flow alternately through them. By preference the valve 45 is connected by a linkage 46 with the valve 20 so that when the valve 45 is operated to permit discharge of the material from the receptacle 43 the valve 20 will be opened and when the discharge is cut off the valve 20 will be closed.

In the form of construction shown, the valve mechanisms comprise a relatively large valve opening to insure fast emptying of the frozen mass and a relatively small opening to permit the discharge at will of sufficient material for testing purposes. This arrangement simplifies the work of the operative and enables him to make as many tests as desired without danger of wasting the material or splashing it on the floor and surrounding objects.

As shown, a single valve element controls both valve openings and when such element is operated it first opens the valve 33 and then the valve opening 27. To effect the discharge of a small quantity of material for testing the valve element is moved outwardly a predetermined distance and then returned.

To those skilled in the art to which this invention relates many changes in construction and widely differing embodiments and applications of the invention will suggest themselves without departing from the spirit and scope thereof. The disclosures and the description herein are purely illustrative and are not intended to be in any sense limiting.

What is claimed is:

1. In apparatus of the class described, the combination of a support, a freezing member mounted thereon and comprising a cylinder disposed vertically and having heads for closing its upper and lower ends, said lower head being formed with an opening having a straight edged wall and a horizontal slidable valve element for controlling the rate of falling discharge of material through said opening, said element being formed with a cut away arranged when said element is moved to a predetermined position to co-operate with the said wall of said opening to form a discharge port of relatively small capacity.

2. In apparatus of the class described, the combination of a support, a freezing member mounted thereon and comprising a vertically disposed cylinder having a head for closing its lower end, and valve elements on said head for controlling the discharge of material from said cylinder, said elements comprising an opening passageway having a wall formed in said head and a walled member movably mounted relative to said head to open and close said opening, one of said elements being formed with a cut away the wall of which co-operates with the wall of the other element to form a relatively small discharge opening when said member is moved to a predetermined position.

3. In apparatus of the class described, the combination of a support, a freezing member mounted thereon and comprising a cylinder disposed vertically and having heads for closing its upper and lower ends, said lower head being formed with a discharge passageway having one straight side wall, guides beneath said lower head, a valve member having a generally straight front edge and being slidable on said guides horizontally across the passageway at right angles to the straight side wall thereof, said valve member having a cut-away portion on its front edge, spring supports between said valve member and said guides and means for moving said valve member to predetermined positions across said discharge passageway.

In testimony whereof, I have hereunto signed my name.

JOAN S. PFOUTS,
*Administratrix of the Estate of Leroy S. Pfouts, Deceased.*